Dec. 15, 1925.

E. L. PRENTISS 1,565,393

DUAL WHEEL FOR VEHICLES

Filed March 10, 1925

Inventor
Ellsworth L. Prentiss

By A. B. Bowman

Attorney

Patented Dec. 15, 1925.

1,565,393

UNITED STATES PATENT OFFICE.

ELLSWORTH L. PRENTISS, OF LOS ANGELES, CALIFORNIA, ASSIGNOR TO THE PICKWICK CORPORATION, OF LOS ANGELES, CALIFORNIA, A CORPORATION OF CALIFORNIA.

DUAL WHEEL FOR VEHICLES.

Application filed March 10, 1925. Serial No. 14,406.

*To all whom it may concern:*

Be it known that I, ELLSWORTH L. PRENTISS, a citizen of the United States, residing at Los Angeles, in the county of Los Angeles and State of California, have invented certain new and useful Improvements in Dual Wheels for Vehicles, of which the following is a specification.

My invention relates to dual wheels for vehicles, more particularly to that class of wheels provided with pneumatic tires which need to be removed when punctured, and the objects of my invention are:

First, to provide a dual wheel for vehicles in which the tire and rim may be readily changed on either the inner or outer wheel members. Second, to provide a wheel of this class in which the outer wheel member may be removed by the removing of six nuts and which provides ready access to the inner wheel so that the tire and rim may be readily removed from the inner wheel portion. Third, to provide a dual wheel in which conventional spare tires and rims may be used. Fourth, to provide a novelly constructed dual wheel. Fifth, to provide a dual wheel of this class in which the portions supporting the tires may be spaced so that the tires are spaced from each other some distance so they do not chafe or rub against each other, and sixth, to provide a dual wheel of this class which is very simple and economical of construction, durable, efficient, easy of operation for changing the tires and which will not readily deteriorate or get out of order.

Figure 1:
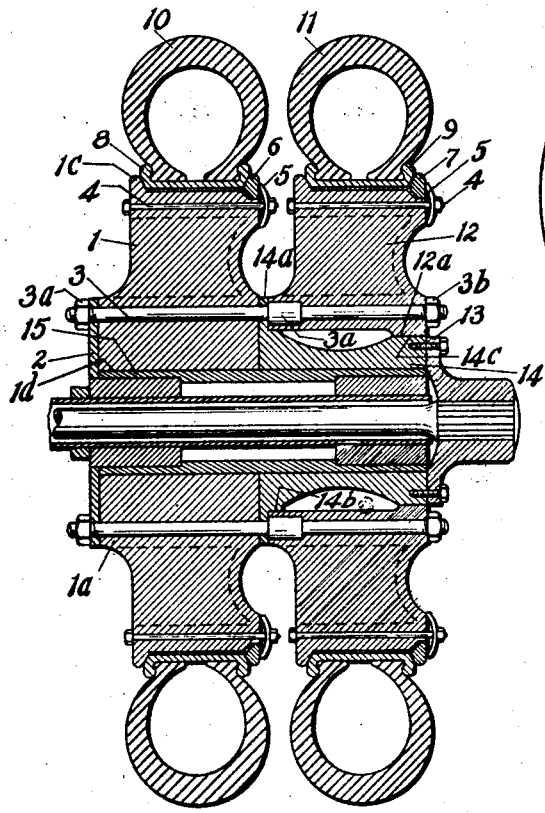
Figure 2:
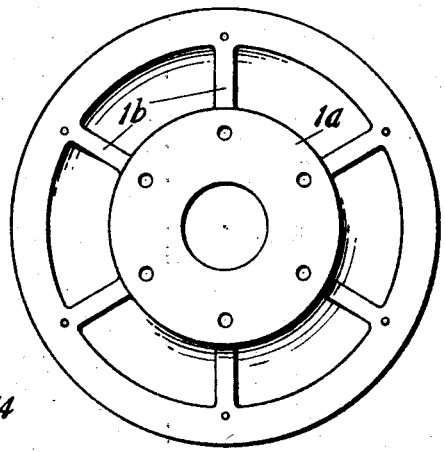
Figure 3:
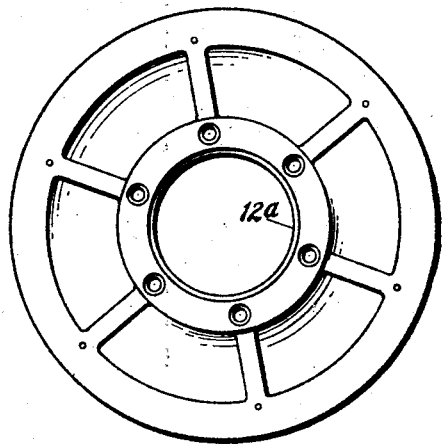
Figure 4:
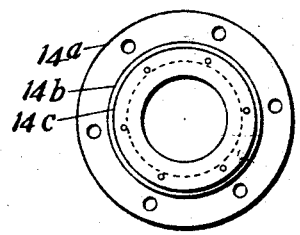

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a transverse sectional view of my dual wheel with the rims and tires shown thereon. Fig. 2 is an inner view of the inner wheel member minus the rim and tire. Fig. 3 is a similar view of the outer wheel member and Fig. 4 is a detailed end elevational view of the outer wheel member support.

Similar characters of reference refer to similar parts and portions throughout the several views of the drawings.

The inner wheel member 1, hub flange member 2, bolts 3, rim clamp bolts 4, rim clamp members 5, key rings 6 and 7, tire rims 8 and 9, tires 10 and 11, outer wheel member 12, outer hub flange 13, outer wheel member support 14, and skein 15, constitute the principal parts and portions of my dual wheel structure.

It is preferred to make the members 1 and 12 of aluminum to provide strength and lightness of structure. The member 1 is shaped, as shown best in Figs. 1 and 2 of the drawings, and preferably cast. It is provided with an extended portion $1^a$ for the support of the hub flange 2 and is provided with cut away portion between rim portions $1^b$, as shown best in Fig. 2 of the drawings. It is provided on its periphery with a flange $1^c$ adapted for one side of the rim 8 to rest against. It will be here noted that the rims 8 and 9 and tires 10 and 11 are of the ordinary or conventional type of spare tires and rims and are supported in the conventional manner by means of split rims 6 and 7 which are of the conventional type and by bolts 4 and the clamp members 5, which are also of the conventional type. The central portion of the inner wheel member 1 is provided with a bore $1^d$ in which the conventional skein, bearings and axle may be mounted in the usual manner. Mounted on the skein 15 is the outer wheel member support 14 which is provided with an outwardly extending flange $14^a$ on its inner side and with supporting ledges $14^b$ and $14^c$. It will be noted that the ledge $14^c$ is about one-eighth of an inch less in diameter than the ledge $14^b$ so that the wheel member 12 may be readily positioned over the member 14 as shown best in Fig. 1 of the drawings. This member 14 is supported in position relatively to the member 1 by means of a plurality of bolts 3, in this case I have shown six. These bolts are provided with enlarged portions $3^a$ intermediate their ends, the one side of which enlarged portion butts against the flange portion 14ª and the extended end passes through the wheel member 1 and hub flange 2 and is provided with a nut 3ª on its inner end, thus providing means for clamping the member 14 against the outer face of the wheel member 1, as shown best in Fig. 1 of the drawings. Mounted on the member 14 is the outer wheel member 12 which is provided with an extended bearing and portion 12ª which rests on the ledge 14ᶜ and the opposite side of the wheel member 12 rests on the ledge 14ᵈ. This member 12 is provided with holes conformnig with the holes in the member 1 so that the bolts 3 which are extended from the large portion 3ª pass through the member 12 and are supported by means of nuts 3ᵇ. It will be noted that the member 12 is provided with enlarged recesses adapted for receiving the enlarged portion 3ª of the bolts 3, thus providing means for rigidly clamping the wheel member 12 in position in connection with the members 1 and 14, as shown best in Fig. 1 of the drawings. The perimeter of the outer wheel member 12 is the same as that of the wheel member 1, hereinbefore described, and supports the rim 9 and tire 11 in the same manner as hereinbefore described. This outer wheel member 12 is provided with cut away portions and with flanges, as shown best in Fig. 3 of the drawings, to lighten the wheel member.

When it is desired to change the outer tire the usual procedure is all that is necessary, that of removing the nuts from the bolts 4 and removing the key ring 7 then taking the tire and rim from the wheel and placing another in its place. When it is desired to change the inner tire the nuts 3ᵇ are removed from the bolts 3 after which the wheel member 12 together with the tire and rim can be shifted outwardly off of the member 14. Then the nuts on bolts 4 and clamps 5 are removed and the key ring 6 removed thus proceeding in the usual manner and another tire and rim placed in position, after which the wheel member 12, together with its rim and tire may be placed back into position on the bolts 3 and the nuts 3ᵇ placed on the ends of the bolts 3, thus clamping the outer wheel member 12 in position relatively to the members 1 and 14.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

Having thus described my invention what I claim as new and desire to secure by Letters Patent is:

1. In dual vehicle wheels, a wheel member secured to the hub and provided on its periphery with the conventional spare tire and rim securing means and provided with a plurality of holes through said member, an outer wheel member support provided with an extending flange provided with holes conforming with the holes in said wheel member and provided with two diameter ledges in spaced relation adapted to be secured to the hub of the wheel, a plurality of bolts provided with enlarged portions adapted to rest against said flange and pass through the first mentioned wheel member provided with nuts on their opposite ends adapted to clamp said support to said first mentioned wheel member, an outer wheel member provided with a ledge portion adapted to rest on the outer ledge on said support and provided with enlarged recesses and bolt holes adapted to receive the enlarged portions of said bolts and provided on its periphery with the conventional tire and rim supporting means.

2. In a dual wheel for vehicles, an inner wheel member provided with a plurality of bolt holes concentric therewith, spaced from its perimeter some distance, an outer wheel supporting member provided with a flange provided with holes conforming with the holes in said first mentioned wheel member, a plurality of bolts provided with enlarged portions intermediate their ends, one side of which is adapted to rest against said flange and clamp said flange against said first mentioned wheel member and an outer wheel member provided with holes adapted to fit the extended ends of said bolts and fit snugly on said wheel supporting member and be clamped thereon by the extended ends of said bolts.

3. In dual wheels for vehicles, an inner wheel member, an outer wheel member, an intermediate support for said outer wheel member provided with a flange extending between said wheel members and a plurality of bolts extending through said wheel members and said flange adapted to clamp said wheel members and said outer wheel supporting member in rigid relation to each other.

4. In dual wheels for vehicles, an inner wheel member, an outer wheel member, an intermediate support for said outer wheel member provided with a flange extending between said wheel members, a plurality of bolts extending through said wheel members and said flange adapted to clamp said wheel members and said outer wheel supporting member in rigid relation to each other and hub means secured to the inner side of the inner wheel member and to the outer side of the outer wheel member support.

5. In dual wheels for vehicles, an inner wheel member, an outer wheel member, an intermediate support for said outer wheel member provided with a flange extending between said wheel members, a plurality of bolts extending through said wheel member and said flange adapted to clamp said wheel members and said outer wheel supporting member in rigid relation to each other and conventional means for securing the conventional spare tire and rim on the periphery of both said inner and outer wheel members.

In testimony whereof, I have hereunto set my hand at Los Angeles, California this 25th day of February 1925.

ELLSWORTH L. PRENTISS.